United States Patent
Lin

(10) Patent No.: US 8,424,046 B2
(45) Date of Patent: Apr. 16, 2013

(54) SET-TOP BOX AND METHOD OF PROVIDING VIDEO ON DEMAND THERETO

(75) Inventor: Han-Tzung Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 567 days.

(21) Appl. No.: 12/649,492

(22) Filed: Dec. 30, 2009

(65) Prior Publication Data

US 2011/0078752 A1     Mar. 31, 2011

(30) Foreign Application Priority Data

Sep. 30, 2009   (CN) .......................... 2009 1 0308014

(51) Int. Cl.
*H04N 7/173*     (2011.01)
(52) U.S. Cl.
USPC ............................................. 725/91; 725/100
(58) Field of Classification Search ............. 725/91, 725/100
See application file for complete search history.

(56) References Cited

U.S. PATENT DOCUMENTS

| | | | | |
|---|---|---|---|---|
| 8,189,470 | B2 * | 5/2012 | Nakashima et al. .......... | 370/231 |
| 2002/0078151 | A1 * | 6/2002 | Wickam et al. ............... | 709/204 |
| 2006/0195881 | A1 * | 8/2006 | Segev et al. ................... | 725/116 |
| 2008/0095057 | A1 * | 4/2008 | Zhou ............................. | 370/235 |
| 2009/0161629 | A1 * | 6/2009 | Purkayastha et al. ......... | 370/331 |
| 2010/0263002 | A1 * | 10/2010 | Meuninck et al. .............. | 725/91 |

* cited by examiner

*Primary Examiner* — Pankaj Kumar
*Assistant Examiner* — Franklin Andramuno
(74) *Attorney, Agent, or Firm* — Altis Law Group, Inc.

(57) ABSTRACT

A method of providing video on demand to a set-top box includes sending playing parameters of a video file to a video on demand server, and receiving information of the video file and predetermined quality of service parameters of the set-top box. The method further includes receiving updated quality of service parameters input by a user, and sending the updated quality of service parameters to a worldwide interoperability for microwave access client module of the set-top box, and sending the updated quality of service parameters to a worldwide interoperability for microwave access base station. The method also includes sending a playback instruction to the video on demand server, and receiving video streaming data of the video file based on the updated quality of service parameters from the video on demand server.

15 Claims, 2 Drawing Sheets

SET-TOP BOX AND METHOD OF PROVIDING VIDEO ON DEMAND THERETO

BACKGROUND

1. Technical Field

Embodiments of the present disclosure relate to video playback, and more particularly to a set-top box and a method of providing video on demand (VOD) to the set-top box.

2. Description of Related Art

VOD systems allows selection and viewing of video over a network. Worldwide interoperability for microwave access (WIMAX) is a telecommunication technology aimed at providing wireless data over long distances in a variety of ways, and providing quality of service (QoS) for the wireless data. Thus, QoS for VOD systems in a WIMAX network is critical.

What is needed, therefore, is an improved set-top box and a method of providing video on demand (VOD) to the set-top box to provide QoS for VOD system in a WIMAX network.

DETAILED DESCRIPTION

All of the processes described may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
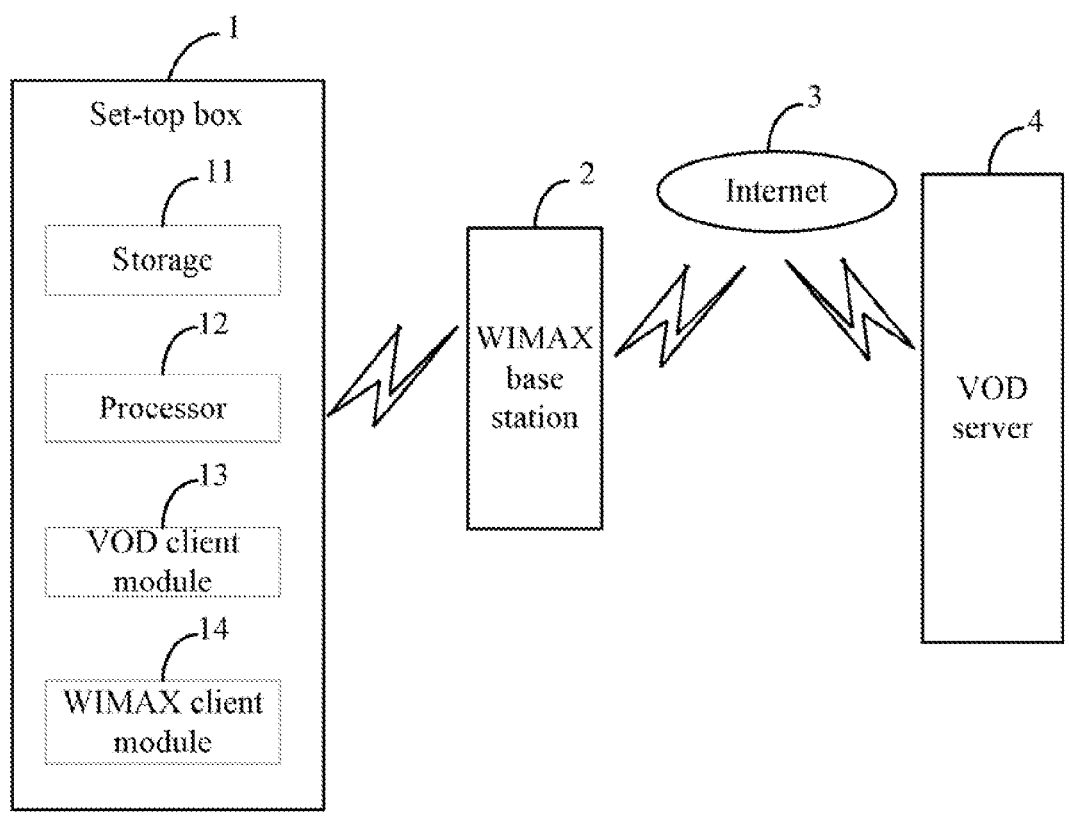
FIG. 1 is a block diagram of one embodiment of a set-top box.

FIG. 1 is a block diagram of one embodiment of a set-top box 1. The set-top box 1 communicates with a worldwide interoperability for microwave access (WIMAX) base station 2 via a WIMAX network. The WIMAX base station 2 communicates with a video on demand (VOD) server 4 over a communication network, such as the Internet 3. The VOD server 4 stores predetermined quality of service (QoS) parameters of the set-top box 1. In one embodiment, the QoS parameters include resource-allocation, admission-control, congestion-control, buffering, scheduling, traffic-priority, max-sustained-traffic-rate, min-reserved-traffic-rate, and max-latency for data between the VOD server 4 and the set-top box 1, for example. In one embodiment, the set-top box 1 may be used to obtain predetermined QoS parameters from the VOD server 4, update the predetermined QoS parameters to generate updated QoS parameters, send the updated QoS parameters to the WIMAX base station 2, receive video streaming data of a video file based on the updated QoS parameters.

In the embodiment as shown in FIG. 1, the set-top box 1 may include storage 11 and a processor 12. The storage 11 stores one or more programs, such as programs of an operating system, other applications of the set-top box 1, and various kinds of data, such as playing parameters, for example. In one embodiment, the storage 11 may be a memory of the set-top box 1 or an external storage card, such as a memory stick, a subscriber identification module (SIM) card, a smart media card, a compact flash card, or any other type of memory card. The processor 12 executes one or more computerized operations of the set-top box 1 and other applications, to provide function thereto.

In one embodiment, the set-top box 1 may further include a VOD client module 13 and a WIMAX client module 14. The modules 13 and 14 may comprise one or more computerized codes to be executed by the processor 12 to perform one or more operations of the set-top box 1.

The VOD client module 13 sends playing parameters of a video file to the VOD server 4. In one embodiment, the playing parameters may include, but are not limited to, a path of the video file, and a signal transport protocol. The path of the video file may be rtsp://172.17.131.26:5012/asset/vscontsrv:0074000230, for example. The signal transport protocol may be a real time streaming data protocol (RTSP), for example. As mentioned, the VOD server 4 stores predetermined QoS parameters of the set-top box 1. The VOD server 4 receives the playing parameters, reads predetermined QoS parameters of the set-top box 1, and sends the predetermined QoS parameters of the set-top box 1 to the VOD client module 13.

The VOD client module 13 receives information of the video file and the predetermined QoS parameters of the set-top box 1 from the VOD server 4. The information of the video file may include a size of a packet of the video file, a type of the video file, and a length of the video file content, for example. As mentioned, the QoS parameters may include resource-allocation, admission-control, congestion-control, buffering, scheduling, traffic-priority, max-sustained-traffic-rate, min-reserved-traffic-rate, and max-latency.

The VOD client module 13 receives updated QoS parameters input by a user, and sends the updated QoS parameters to the WIMAX client module 101.

The WIMAX client module 14 receives the updated QoS parameters, sends the updated QoS parameters to the WIMAX base station 2. The WIMAX base station 2 receives the updated QoS parameters, and updates the predetermined QoS parameters of the set-top box 1 according to the updated QoS parameters.

The WIMAX client module 14 receives confirmation message from the WIMAX base station 2. The confirmation message from the WIMAX base station 2 notifies the WIMAX client module 14 that the WIMAX base station 2 has updated the predetermined QoS parameters according to the updated QoS parameters.

The VOD client module 13 receives the confirmation message from the WIMAX client module 14. The confirmation message from the WIMAX client module 14 notifies the VOD client module 13 that the WIMAX base station 2 has updated the predetermined QoS parameters according to the updated QoS parameters.

The VOD client module 13 sends a playback instruction to the VOD server 4. The playback instruction may include, but is not limited to, the path of the video file. The VOD server 4 receives the playback instruction, searches for the video file according to the playback instruction, and sends the video streaming data of the searched video file to the VOD client module 13.

The VOD client module 13 receives the video streaming data of the video file based on the updated QoS parameters from the VOD server 4.

Figure 2:
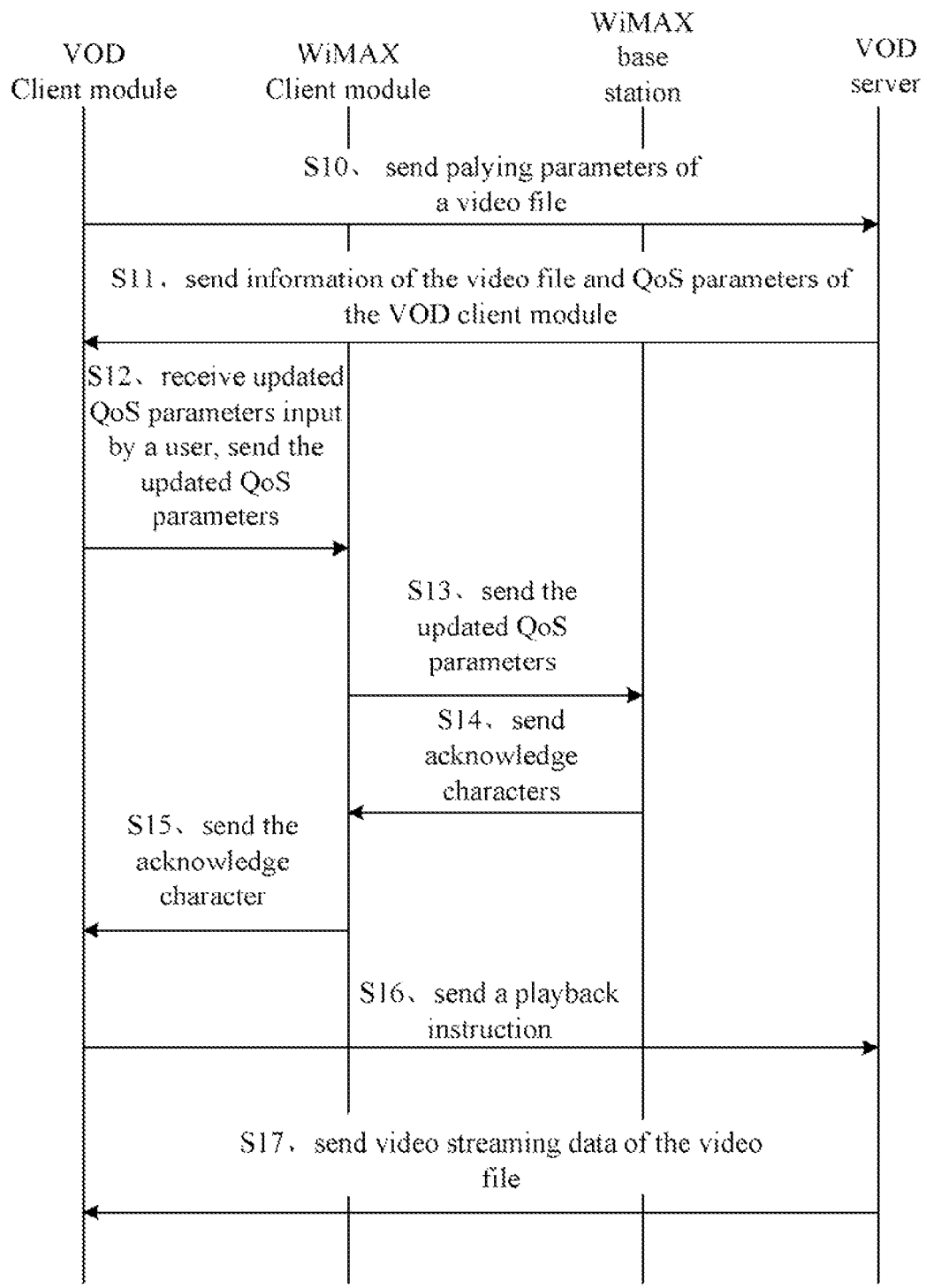
FIG. 2 is a flowchart of one embodiment of a method of providing video on demand (VOD) to a set-top box, such as, for example, that of FIG. 1.

FIG. 2 is a flowchart of one embodiment of a method of providing video on demand (VOD) to a set-top box 1. Depending on the embodiment, additional steps may be added, others removed, and the ordering of the steps may be replaced.

In step S10, the VOD client module 13 sends playing parameters of a video file to the VOD server 4. The VOD server 4 receives the playing parameters, reads predetermined QoS parameters of the set-top box 1 send the playing parameters, and sends the predetermined QoS parameters of the set-top box 1 to the VOD client module 13.

In step S11, the VOD client module 13 receives the predetermined QoS parameters of the set-top box 1 from the VOD server 4.

In step S12, the VOD client module 13 receives updated QoS parameters input by a user, and sends the updated QoS parameters to the WIMAX client module 101.

In step S13, the WIMAX client module 14 receives the updated QoS parameters, sends the updated QoS parameters to the WIMAX base station 2. The WIMAX base station 2 receives the updated QoS parameters, and updates the predetermined QoS parameters of the set-top box 1 according to the updated QoS parameters.

In step S14, the WIMAX client module 14 receives a confirmation message from the WIMAX base station 2.

In step S15, the VOD client module 13 receives the confirmation message from the WIMAX client module 14.

In step S16, the VOD client module 13 sends a playback instruction to the VOD server 4. The VOD server 4 receives the playback instruction, searches for the video file according to the playback instruction, and sends the video streaming data of the searched video file to the VOD client module 13.

In step S17, the VOD client module 13 receives the video streaming data of the video file based on the updated QoS parameters provided by the WIMAX base station 2 from the VOD server 4.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A set-top box, the set-top box in communication with a video on demand (VOD) server through a worldwide interoperability for microwave access (WIMAX) base station, the set-top box comprising:
a storage;
at least one processor; and
one or more programs stored in the storage and being executable by the at least one processor, the one or more programs comprising a VOD client module and a WIMAX client module:
the VOD client module being operable to send playing parameters of a video file to the VOD server, receive information of the video file and predetermined quality of service (QoS) parameters of the set-top box from the VOD server, receive updated QoS parameters input by a user, and send the updated QoS parameters to the WIMAX client module;
the WIMAX client module being operable to send the updated QoS parameters to the WIMAX base station, the WIMAX base station receiving the updated QoS parameters, and updating the predetermined QoS parameters according to the updated QoS parameters; and
the VOD client module being further operable to send a playback instruction to the VOD server, and receive video streaming data of the video file based on the updated QoS parameters from the VOD server.

2. The set-top box according to claim 1, wherein the WIMAX client module is further operable to receive a confirmation message from the WIMAX base station, and send the confirmation message to the VOD client module.

3. The set-top box according to claim 1, wherein the playing parameters comprise a path of the video file and signal transport protocol.

4. The set-top box according to claim 1, wherein the QoS parameters comprise resource-allocation, admission-control, congestion-control, buffering, scheduling, traffic-priority, max-sustained-traffic-rate, min-reserved-traffic-rate, and max-latency.

5. The set-top box according to claim 1, wherein the information of the video file comprises a size of a packet of the video file, a type of the video file, and a length of the video file content.

6. A method of providing video on demand to a set-top box, the method comprising:
sending playing parameters of a video file to a video on demand (VOD) server from a VOD client module of the set-top box;
receiving information of the video file and predetermined quality of service (QoS) parameters of the set-top box from the VOD server;
receiving updated QoS parameters input by a user, and sending the updated QoS parameters to a worldwide interoperability for microwave access (WIMAX) client module of the set-top box from the VOD client module;
sending the updated QoS parameters to a WIMAX base station from the WIMAX client module, wherein the WIMAX base station receives the updated QoS parameters, and updates the predetermined QoS parameters according to the updated QoS parameters;
sending a playback instruction to the VOD server from the VOD client module; and
receiving video streaming data of the video file based on the updated QoS parameters from the VOD server.

7. The method according to claim 6, further comprising: receiving confirmation message by the WIMAX client module from the WIMAX base station, and sending the confirmation message to the VOD client module.

8. The method according to claim 6, wherein the playing parameters comprise a path of the video file and signal transport protocol.

9. The method according to claim 6, wherein the QoS parameters comprise resource-allocation, admission-control, congestion-control, buffering, scheduling, traffic-priority, max-sustained-traffic-rate, min-reserved-traffic-rate, and max-latency.

10. The method according to claim 6, wherein the information of the video file comprises a size of a packet of the video file, a type of the video file, and a length of the video file content.

11. A non-transitory storage medium having stored thereon instructions that, when executed by a processor of a set-top box cause the processor to perform a method of providing video on demand the set-top box, the method comprising:
sending playing parameters of a video file to a video on demand (VOD) server from a VOD client module of the set-top box;
receiving information of the video file and predetermined quality of service (QoS) parameters of the set-top box from the VOD server;
receiving updated QoS parameters input by a user, and sending the updated QoS parameters to a worldwide interoperability for microwave access (WIMAX) client module of the set-top box from the VOD client module;
sending the updated QoS parameters to a WIMAX base station from the WIMAX client module, wherein the WIMAX base station receives the updated QoS parameters, and updates the predetermined QoS parameters according to the updated QoS parameters;

sending a playback instruction to the VOD server from the VOD client module; and receiving video streaming data of the video file based on the updated QoS parameters from the VOD server.

12. The non-transitory storage medium according to claim 11, further comprising: receiving confirmation message by the WIMAX client module from the WIMAX base station, and sending the confirmation message to the VOD client module.

13. The non-transitory storage medium according to claim 11, wherein the playing parameters comprise a path of the video file and signal transport protocol.

14. The non-transitory storage medium according to claim 11, wherein the QoS parameters comprise resource-allocation, admission-control, congestion-control, buffering, scheduling, traffic-priority, max-sustained-traffic-rate, min-reserved-traffic-rate, and max-latency.

15. The non-transitory storage medium according to claim 11, wherein the information of the video file comprises a size of a packet of the video file, a type of the video file, and a length of the video file content.

* * * * *